(12) United States Patent
Coates et al.

(10) Patent No.: US 7,509,645 B2
(45) Date of Patent: Mar. 24, 2009

(54) METHODS AND APPARATUS FOR LOAD BALANCING STORAGE NODES IN A DISTRIBUTED NETWORK ATTACHED STORAGE SYSTEM

(75) Inventors: Joshua L. Coates, Orinda, CA (US); Patrick E. Bozeman, Berkeley, CA (US); Alfred Gary Landrum, San Francisco, CA (US); Peter D. Mattis, San Francisco, CA (US); Naveen Nalam, San Francisco, CA (US); Drew S. Roselli, Berkeley, CA (US)

(73) Assignee: Intel Corporation, Santa Clara, CA (US)

( * ) Notice: Subject to any disclaimer, the term of this patent is extended or adjusted under 35 U.S.C. 154(b) by 848 days.

(21) Appl. No.: 10/367,541

(22) Filed: Feb. 13, 2003

(65) Prior Publication Data

US 2004/0078466 A1    Apr. 22, 2004

Related U.S. Application Data

(60) Provisional application No. 60/419,778, filed on Oct. 17, 2002.

(51) Int. Cl.
*G06F 9/46* (2006.01)
*G06F 7/00* (2006.01)
*G06F 12/00* (2006.01)
*G06F 15/173* (2006.01)

(52) U.S. Cl. .................. 718/105; 707/10; 711/111; 709/226

(58) Field of Classification Search .............. 718/104, 718/105; 709/223, 248, 226; 707/204, 10; 711/111
See application file for complete search history.

(56) References Cited

U.S. PATENT DOCUMENTS 5,497,422 A    3/1996    Tysen et al.

(Continued)

FOREIGN PATENT DOCUMENTS

EP        0 646 858 A1    8/1997

(Continued)

OTHER PUBLICATIONS

Mogul: Internet Subnets; Network Working Group; RFC 917; Oct. 1984; 18 pages.

(Continued)

*Primary Examiner*—Meng-Ai An
*Assistant Examiner*—Camquy Truong
(74) *Attorney, Agent, or Firm*—Christopher K. Gagne (57) ABSTRACT

A distributed data storage system stores a single image file system across a plurality of physical storage volumes. The physical storage may be direct attached storage, or may be coupled through a storage area network ("SAN"). One or more clients communicate with a plurality of storage nodes through a network. A client of the distributed data storage system transmits a request over the network for a file identified in the file system. A load-balancing switch selects one of the storage nodes to process the request. The storage node accesses at least one of the physical volumes and transmits a response for the storage operation to the client.

12 Claims, 9 Drawing Sheets

U.S. PATENT DOCUMENTS

| | | | |
|---|---|---|---|
| 5,506,984 | A | 4/1996 | Miller |
| 5,550,986 | A | 8/1996 | DuLac |
| 5,692,155 | A | 11/1997 | Iskiyan et al. |
| 5,708,832 | A | 1/1998 | Inniss et al. |
| 5,751,961 | A | 5/1998 | Smyk |
| 5,757,642 | A | 5/1998 | Jones |
| 5,757,920 | A | 5/1998 | Misra et al. |
| 5,764,972 | A | 6/1998 | Crouse et al. |
| 5,796,952 | A | 8/1998 | Davis et al. |
| 5,805,699 | A | 9/1998 | Akiyama et al. |
| 5,870,537 | A | 2/1999 | Kern et al. |
| 5,878,248 | A | 3/1999 | Tehranian et al. |
| 5,923,846 | A | 7/1999 | Gage et al. |
| 5,933,834 | A | 8/1999 | Aichelen |
| 5,937,406 | A | 8/1999 | Balabine et al. |
| 5,948,062 | A | 9/1999 | Tzelnic et al. |
| 5,978,577 | A | 11/1999 | Rierden et al. |
| 5,991,542 | A | 11/1999 | Han et al. |
| 6,032,196 | A | 2/2000 | Monier |
| 6,081,883 | A | 6/2000 | Popelka et al. |
| 6,101,508 | A * | 8/2000 | Wolff .................... 709/223 |
| 6,108,155 | A | 8/2000 | Tanaka et al. |
| 6,108,300 | A | 8/2000 | Coile et al. |
| 6,108,655 | A | 8/2000 | Schleimer et al. |
| 6,108,703 | A | 8/2000 | Leighton et al. |
| 6,128,627 | A | 10/2000 | Mattis et al. |
| 6,141,759 | A * | 10/2000 | Braddy .................... 726/14 |
| 6,145,012 | A | 11/2000 | Small |
| 6,148,349 | A | 11/2000 | Chow et al. |
| 6,170,013 | B1 | 1/2001 | Murata |
| 6,173,374 | B1 | 1/2001 | Heil et al. |
| 6,219,753 | B1 | 4/2001 | Richardson |
| 6,223,291 | B1 | 4/2001 | Puhl et al. |
| 6,236,999 | B1 | 5/2001 | Jacobs et al. |
| 6,256,673 | B1 | 7/2001 | Gayman |
| 6,263,402 | B1 | 7/2001 | Ronstroem et al. |
| 6,272,584 | B1 | 8/2001 | Stancil |
| 6,285,656 | B1 | 9/2001 | Chaganty et al. |
| 6,304,980 | B1 | 10/2001 | Beardsley et al. |
| 6,314,462 | B1 | 11/2001 | Hellenga et al. |
| 6,314,465 | B1 | 11/2001 | Paul et al. |
| 6,324,581 | B1 | 11/2001 | Xu et al. |
| 6,327,614 | B1 | 12/2001 | Asano et al. |
| 6,351,775 | B1 | 2/2002 | Yu |
| 6,356,929 | B1 | 3/2002 | Gall et al. |
| 6,360,306 | B1 | 3/2002 | Bergsten |
| 6,389,462 | B1 | 5/2002 | Cohen et al. |
| 6,393,466 | B1 | 5/2002 | Hickman et al. |
| 6,405,201 | B1 | 6/2002 | Nazari |
| 6,438,125 | B1 | 8/2002 | Brothers |
| 6,442,548 | B1 | 8/2002 | Balabine et al. |
| 6,460,055 | B1 * | 10/2002 | Midgley et al. .............. 707/204 |
| 6,487,561 | B1 | 11/2002 | Ofek et al. |
| 6,507,883 | B1 | 1/2003 | Bello et al. |
| 6,553,376 | B1 | 4/2003 | Lewis et al. |
| 6,553,389 | B1 | 4/2003 | Golding et al. |
| 6,574,641 | B1 | 6/2003 | Dawson et al. |
| 6,578,158 | B1 | 6/2003 | Deitz et al. |
| 6,598,051 | B1 | 7/2003 | Wiener et al. |
| 6,611,869 | B1 | 8/2003 | Eschelbeck et al. |
| 6,622,247 | B1 | 9/2003 | Isaak |
| 6,654,772 | B1 | 11/2003 | Crow et al. |
| 6,704,838 | B2 | 3/2004 | Anderson |
| 6,718,347 | B1 | 4/2004 | Wilson |
| 6,782,389 | B1 | 8/2004 | Chrin et al. |
| 6,895,418 | B1 | 5/2005 | Crow et al. |
| 6,912,548 | B1 | 6/2005 | Black |
| 6,931,450 | B2 | 8/2005 | Howard et al. |
| 6,948,062 | B1 | 9/2005 | Clapper |
| 6,952,737 | B1 | 10/2005 | Coates et al. |
| 7,007,047 | B2 * | 2/2006 | Zelenka et al. .............. 707/204 |
| 7,107,385 | B2 * | 9/2006 | Rajan et al. .................... 711/4 |
| 7,194,538 | B1 | 3/2007 | Rabe et al. |
| 7,203,731 | B1 | 4/2007 | Coates et al. |
| 7,266,555 | B1 | 9/2007 | Coates et al. |
| 7,266,556 | B1 | 9/2007 | Coates |
| 7,281,168 | B1 | 10/2007 | Coates et al. |
| 7,428,540 | B1 | 9/2008 | Coates et al. |
| 2001/0047400 | A1 * | 11/2001 | Coates et al. ............... 709/219 |
| 2002/0010757 | A1 | 1/2002 | Granik et al. |
| 2002/0020757 | A1 | 2/2002 | Speier |
| 2002/0054114 | A1 | 5/2002 | Shuping et al. |
| 2002/0078244 | A1 * | 6/2002 | Howard ..................... 709/248 |
| 2002/0083120 | A1 | 6/2002 | Soltis |
| 2002/0133491 | A1 | 9/2002 | Sim et al. |
| 2002/0133539 | A1 | 9/2002 | Monday |
| 2004/0078456 | A1 | 4/2004 | Kennedy et al. |
| 2004/0078465 | A1 | 4/2004 | Coates et al. |
| 2004/0078466 | A1 | 4/2004 | Coates et al. |
| 2004/0088297 | A1 | 5/2004 | Coates |
| 2005/0246396 | A1 | 11/2005 | Oreizy et al. |
| 2007/0094378 | A1 | 4/2007 | Baldwin et al. |

FOREIGN PATENT DOCUMENTS

| | | |
|---|---|---|
| WO | WO 99/45491 | 9/1999 |
| WO | 01/67707 A1 | 9/2001 |
| WO | WO 01/67707 A2 | 9/2001 |

OTHER PUBLICATIONS

Microsoft Press, Computer Dictionary 3rd Ed., 1997, p. 337.

Kline: Distributed File Systems for Storage Area Networks; Advanced Digital Info Corp; 11 pages.

Apache-SSL: Certificates, Configuration and More Information Systems and Technology ; University of Waterloo; Sep. 15, 1998; 16 pages.

Schroeder: Implementing Multi-Protocol Authentication/Security Systems; Grid (GSI) Secure Socket Layer (X.509 Certificates), Kerberos, DCE, and Custom Systems for Secure Distributed Data Access; Jul. 19, 1999; 4 pages.

Bea WebLogic SSL; Server 4.5; 20 pages.

Certificate to LDAP Mapping in Netscape Servers, Rev 1.2; Aug. 28, 1997; Structured Arts Technical Notes.

U.S. Appl. No. 09/753,332, Office action dated Oct. 19, 2006, 1-26.

U.S. Appl. No. 09/733,314, Office action, (Nov. 15, 2006), 1-14.

U.S. Appl. No. 10/368,026, Office Action mailed Mar. 29, 2007, 11 pages.

U.S. Appl. No. 10/367,436, Office Action mailed Aug. 21, 2007, 13 pages.

Coates, Joshua et al., U.S. Appl. No. 09/753,141, Office Action Response dated Oct. 6, 2005, 11 pgs.

Coates, Joshua et al., U.S. Appl. No. 09/753,141, Office Action dated Jan. 26, 2007, 16 pgs.

Coates, Joshua et al., U.S. Appl. No. 09/753,336, Notice of Allowance dated Aug. 30, 2007, 4 pgs.

Coates, Joshua et al., U.S. Appl. No. 09/753,141, Office Action dated Jul. 9, 2004, 11 pgs.

Coates, Joshua L., et al., U.S. Appl. No. 11/173,754, Notice of Allowance dated Apr. 11, 2008, 10 pgs.

Coates, Joshua et al., U.S. Appl. No. 09/733,314, Office Action dated Nov. 21, 2002, 9 pgs.

Coates, Joshua et al., U.S. Appl. No. 09/753,221, Office Action dated Jun. 2, 2004, 11 pgs.

Coates, Joshua et al., U.S. Appl. No. 09/753,220, Office Action Response dated Mar. 23, 2006, 8pgs.

Coates, Joshua et al., U.S. Appl. No. 09/753,220, Office Action dated Jun. 22, 2006, 10pgs.

Coates, Joshua et al., U.S. Appl. No. 09/753,220, Office Action Response dated Sep. 20, 2006, 9 pgs.

Coates, Joshua et al., U.S. Appl. No. 09/753,220, Notice of Allowance dated Dec. 1, 2006, 4 pgs.

Coates, Joshua et al., U.S. Appl. No. 09/733,314, Office Action Response dated May 21, 2003, 9 pgs.

Coates, Joshua et al., U.S. Appl. No. 09/733,314, Office Action dated Aug. 7, 2003, 10 pgs.
Coates, Joshua et al., U.S. Appl. No. 09/733,314, Office Action Response dated Feb. 9, 2004, 14 pgs.
Coates, Joshua et al., U.S. Appl. No. 09/733,314, Advisory Action dated Feb. 27, 2004, 3 pgs.
Coates, Joshua et al., U.S. Appl. No. 09/753,221, Office Action Response dated Jul. 29, 2004, 11 pgs.
Coates, Joshua et al., U.S. Appl. No. 09/7633,314, Office Action Response dated Jul. 19, 2004, 9 pgs.
Coates, Joshua et al., U.S. Appl. No. 09/733,314, Office Action dated Oct. 5, 2004, 10 pgs.
Coates, Joshua et al., U.S. Appl. No. 09/753,221, Notice of Allowance dated Sep. 29, 2004, 9 pgs.
Coates, Joshua et al., U.S. Appl. No. 09/733,314, Office Action Response dated Jan. 5, 2005, 7 pgs.
Coates, Joshua et al., U.S. Appl. No. 09/733,314, Office Action dated Apr. 18, 2005, 9 pgs.
Coates, Joshua et al., U.S. Appl. No. 09/753,221, Notice of Allowance dated Mar. 30, 2005, 8 pgs.
Coates, Joshua et al., U.S. Appl. No. 09/733,314, Office Action Response dated Aug. 12, 2005, 10 pgs.
Coates, Joshua et al., U.S. Appl. No. 09/733,314, Office Action dated Nov. 3, 2005, 10 pgs.
Coates, Joshua et al., U.S. Appl. No. 09/733,314, Office Action Response dated Feb. 3, 2006 11 pgs.
Coates, Joshua et al., U.S. Appl. No. 09/733,314, Office Action dated May 10, 2006, 13 pgs.
Coates, Joshua et al., U.S. Appl. No. 09/733,314, Office Action Response dated Aug. 15, 2006, 14 pgs.
Coates, Joshua et al., U.S. Appl. No. 09/733,314, Office Action dated Nov. 15, 2006, 13 pgs.
Coates, Joshua et al., U.S. Appl. No. 09/733,314, Office Action Response dated Feb. 15, 2007, 10 pgs.
Coates, Joshua et al., U.S. Appl. No. 09/753,220, Office Action dated May 20, 2004, 7 pgs.
Coates, Joshua et al., U.S. Appl. No. 09/733,314, Notice of Allowance dated May 3, 2007, 12 pgs.
Coates, Joshua et al., U.S. Appl. No. 09/753,220, Office Action Response dated Sep. 27, 2004, 9 pgs.
Coates, Joshua et al., U.S. Appl. No. 09/753,220, Office Action dated Jul. 29, 2005, 6 pgs.
Coates, Joshua et al., U.S. Appl. No. 09/753,220, Office Action Response dated Nov. 28, 2005, 8 pgs.
"Non-Final Office Action received for U.S. Appl. No. 09/695,499 mailed on Nov. 20, 2002", 9 pgs.
"Response to Non-Final Office Action received for U.S. Appl. No. 09/695,499, filed on May 27, 2003", 12 pgs.
"Final Office Action received for U.S. Appl. No. 09/695,499 mailed on Aug. 14, 2003", 11 pgs.
"Response to Final Office Action received for U.S. Appl. No. 09/695,499, filed on Feb. 23, 2004", 13 pgs.
"Non-Final Office Action received for U.S. Appl. No. 09/695,499 mailed on Aug. 10, 2004", 10 pgs.
"Response to Non-Final Office Action received for U.S. Appl. No. 09/695,499, filed on Nov. 10, 2004", 16 pgs.
"Response to Non-Final Office Action received for U.S. Appl. No. 09/695,499, filed on Dec. 13, 2004", 13 pgs.
"Final Office Action received for U.S. Appl. No. 09/695,499 mailed on Mar. 24, 2005", 15 pgs.
"Response to Final Office Action received for U.S. Appl. No. 09/695,499, filed on Sep. 6, 2005", 12 pgs.
"Non-Final Office Action received for U.S. Appl. No. 09/695,499 mailed on Dec. 1, 2005", 14 pgs.
"Notice of Allowance received for U.S. Appl. No. 11/173,754 mailed on Oct. 6, 2008", 6 pgs.
"Response to Non-Final Office Action received for U.S. Appl. No. 09/695,499, filed on Mar. 3, 3006", 10 pgs.
"Notice of Allowance received for U.S. Appl. No. 11/173,754 mailed on Jul. 22, 2008", 15 pgs.
"Final Office Action received for U.S. Appl. No. 09/695,499 mailed on Jun. 14, 2006", 11 pgs.
"Notice of Allowance received for U.S. Appl. No. 11/173,754 mailed on Apr. 11, 2008", 45 pgs.
"Response to Final Office Action received for U.S. Appl. No. 09/695,499, filed on Sep. 18, 2006", 12 pgs.
"Non-Final Office Action received for U.S. Appl. No. 09/695,499 ,mailed on Dec. 11, 2006", 14 pgs.
"International Search Report received for PCT Application No. PCT/US01/106707 mailed on Feb. 12, 2004", 5 pgs.
"Response to Non-Final Office Action received for U.S. Appl. No. 09/695,499, filed on Mar. 12, 2007", 14 pgs.
"International Preliminary Report on Patentability received for U.S. Appl. No. PCT/US01/106707 mailed on Feb. 17, 2005", 3 pgs.
"Notice of Allowance received for U.S. Appl. No. 09/695,499 mailed on Jun. 9, 2008", 10 pgs.
"Final Office Action received for U.S. Appl. No. 09/753,141 mailed on Jun. 9, 2008", 23 pgs.
"Response to Final Office Action received for U.S. Appl. No. 09/753,141, filed on Jul. 12, 2008", 18 pgs.
"Notice of Allowance received for U.S. Appl. No. 09/753,141 mailed on Sep. 17, 2008", 21 pgs.
Coates, Joshua et al., U.S. Appl. No. 09/753,220, Office Action dated Dec. 23, 2005, 6 pgs.
"U.S. Appl. No. 09/753,220, Office Action Response dated Nov. 28, 2005, 8 pgs.".
"U.S. Appl. No. 09/753,220, Office Action Response dated Sep. 20, 2006, 9 pgs.".
"U.S. Appl. No. 09/753,220, Office Action Response dated Sep. 23, 2004, 9 pgs.".
"U.S. Appl. No. 09/753,220, Office Action Response dated Mar. 23, 2006, 8 pgs.".
"U.S. Appl. No. 09/753,220, Office Action dated Dec. 23, 2005, 6 pgs.".
"U.S. Appl. No. 09/753,220, Office Action dated Jul. 29, 2005, 6 pgs.".
"U.S. Appl. No. 09/753,220, Office Action dated Jun. 22, 2006, 6 pgs.".
"U.S. Appl. No. 09/753,220, Office Action dated May 20, 2004, 7 pgs.".
"U.S. Appl. No. 09/753,220, Notice of Allowance dated Dec. 1, 2006, 4 pgs.".
"Notice of Allowance received for U.S. Appl. No. 10/317,606 mailed on May 20, 2005", 5 pgs.
Non-Final Office Action received for U.S. Appl. No. 10/317,606 mailed on Fev. 28, 2005, 8 pgs.
"Response to Non Final Office Action for U.S. Appl. No. 10/317,606, filed on Mar. 25, 2005", 11 pgs.
"Non-Final Office Action received for U.S. Appl. No. 10/317,606 mailed on Jan. 14, 2005", 9 pgs.
"Response to Non Final Office Action for U.S. Appl. No. 10/317,606, filed on Feb. 2, 2005", 13 pgs.
"Final Office Action received for U.S. Appl. No. 09/753,141 mailed on Jun. 9, 2008", 23 pgs.
"Office Action received for U.S. Appl. No. 09/695,499, mailed on Dec. 11, 2006", 1-16 pgs.
Coates, Joshua et al., U.S. Appl. No. 09/753,332, Office Action dated Nov. 19, 2002, 10 pgs.
Coates, Joshua et al., U.S. Appl. No. 09/753,141, Office Action Response dated Apr. 25, 2007, 12 pgs.
Coates, Joshua et al., U.S. Appl. No. 09/753,332, Office Action Response dated May 19, 2003, 11 pgs.
Coates, Joshua et al., U.S. Appl. No. 09/753,141, Advisory Action dated May 9, 2007, 4 pgs.
Coates, Joshua et al., U.S. Appl. No. 09/753,332, Office Action dated Aug. 14, 2003, 18 pgs.
Coates, Joshua et al., U.S. Appl. No. 09/753,141, Office Action dated Aug. 27, 2007, 16 pgs.
Coates, Joshua et al., U.S. Appl. No. 09/753,332, Office Action Response dated Jul. 20, 2004, 14 pgs.
Coates, Joshua et al., U.S. Appl. No. 09/753,332, Office Action dated Sep. 7, 2004, 14 pgs.
Coates, Joshua et al., U.S. Appl. No. 09/753,141, Office Action Response dated Feb. 26, 2008, 18pgs.

Coates, Joshua et al., U.S. Appl. No. 09/753,332, Office Action Response dated Dec. 7, 2004, 13 pgs.
Coates, Joshua et al., U.S. Appl. No. 09/753,332, Office Action dated Apr. 5, 2005, 15 pgs.
Coates, Joshua et al., U.S. Appl. No. 09/753,332, Office Action Response dated Aug. 5, 2005, 13 pgs.
Coates, Joshua et al., U.S. Appl. No. 09/753,332, Office Action dated Nov. 3, 2005, 15 pgs.
Coates, Joshua et al., U.S. Appl. No. 09/753,332, Office Action Response dated Feb. 3, 2006, 14 pgs.
Coates, Joshua et al., U.S. Appl. No. 09/753,332, Office Action dated May 3, 2006, 19 pgs.
Coates, Joshua et al., U.S. Appl. No. 09/753,332, Office Action Response dated Aug. 1, 2006, 16 pgs.
Coates, Joshua et al., U.S. Appl. No. 09/753,332, Office Action dated Oct. 19, 2006, 22 pgs.
Coates, Joshua et al., U.S. Appl. No. 09/753,332, Office Action Response dated Mar. 16, 2007, 19 pgs.
Coates, Joshua et al., U.S. Appl. No. 09/753,332, Notice of Allowance dated May 29, 2007, 17 pgs.
Coates, Joshua et al., "Network Storage System", U.S. Appl. No. 09/695,499, filed on Oct. 23, 2000.
Coates, Joshua et al., U.S. Appl. No. 09/753,336, Office Action dated Jan. 2, 2004, 14 pgs.
Coates, Joshua et al., U.S. Appl. No. 09/753,336, Office Action Response dated Feb. 2, 2006, 10 pgs.
Coates, Joshua et al., U.S. Appl. No. 09/753,336, Notice of Allowance dated Mar. 29, 2007, 13 pgs.
Coates, Joshua et al., U.S. Appl. No. 09/753,336, Amendment Under 37 CFR 1.312 dated Jun. 20, 2007, pgs.

* cited by examiner

METHODS AND APPARATUS FOR LOAD BALANCING STORAGE NODES IN A DISTRIBUTED NETWORK ATTACHED STORAGE SYSTEM

CROSS-REFERENCES TO RELATED APPLICATIONS

This application claims the benefit of U.S. Provisional Patent Application No. 60/419,778, filed Oct. 17, 2002, entitled "A Distributed Storage System."

BACKGROUND OF THE INVENTION

1. Field of the Invention

The present invention is directed toward the field of data storage, and more particularly toward a distributed network data storage system.

2. Art Background

There is an increasing demand for systems that store large amounts of data. Many companies struggle to provide scalable, cost-effective storage solutions for large amounts of data stored in files (e.g., terabytes of data). One type of prior art system used to store data for computers is known as network attached storage ("NAS"). In a NAS configuration, a computer, such as a server, is coupled to physical storage, such as one or more hard disk drives. The NAS server is accessible over a network. In order to access the storage, the client computer submits requests to the server to store and retrieve data.

Conventional NAS technology has several inherent limitations. First, NAS systems are severely impacted by their fundamental inability to scale performance and capacity. Current NAS systems only scale performance within the limits of a single NAS server with a single network connection. Thus, a single NAS server can only scale capacity to a finite number of disks attached to that NAS server. These fundamental limitations of current file storage systems create a variety of challenges. First, customers must use multiple NAS systems to meet capacity and performance requirements. The use of multiple NAS systems requires the customer to manage multiple file systems and multiple NAS system images. These attempts lead to inefficient utilization of storage assets because files must be manually distributed across multiple NAS systems to meet overall capacity and performance requirements. Invariably, this leaves pockets of unused capacity in the multiple NAS systems. Moreover, frequently accessed files, sometimes referred to as hot files, may only be served by a single NAS server, resulting in a bottleneck that impacts performance of the storage system. These issues result in substantially higher management costs to the end-user as well as high acquisition costs to purchase proprietary NAS systems.

A storage area network ("SAN") is another configuration used to store large amounts of data. In general, a SAN configuration consists of a network of disks. Clients access disks over a network. Using the SAN configuration, the client typically accesses each individual disk as a separate entity. For example, a client may store a first set of files on a first disk in a network, and store a second set of files on a second disk in the SAN system. Thus, this technique requires the clients to manage file storage across the disks on the storage area network. Accordingly, the SAN configuration is less desirable because it requires the client to specifically manage storage on each individual disk. Accordingly, it is desirable to develop a system that manages files with a single file system across multiple disks.

SUMMARY OF THE INVENTION

A distributed data storage system stores a single image file system across a plurality of physical storage volumes. One or more clients communicate with the distributed data storage system through a network. The distributed data storage system includes a plurality of storage nodes. The distributed data storage system contains a load balancing switch, coupled between the network and the storage nodes. In one embodiment, the load balancing switch comprises a layer four load balancing switch. Each storage node services requests for storage operations on the files stored on the physical storage volumes. In one embodiment, the physical storage is direct attached storage. For this embodiment, at least one physical storage volume is directly coupled to each storage node. In another embodiment, the physical storage volumes are coupled to the storage nodes through a storage area network ("SAN").

To conduct a storage operation, including read and write operations, a client transmits a request over the network for a file identified in the file system. The load balancing switch selects one of the storage nodes to process the request. To process the request, the storage node accesses at least one of the physical volumes and transmits a response for the storage operation to the client.

DETAILED DESCRIPTION

The disclosure of U.S. Provisional Patent Application No. 60/419,778, filed Oct. 17, 2002, entitled "A Distributed Storage System", is hereby expressly incorporated herein by reference.

Figure 1:
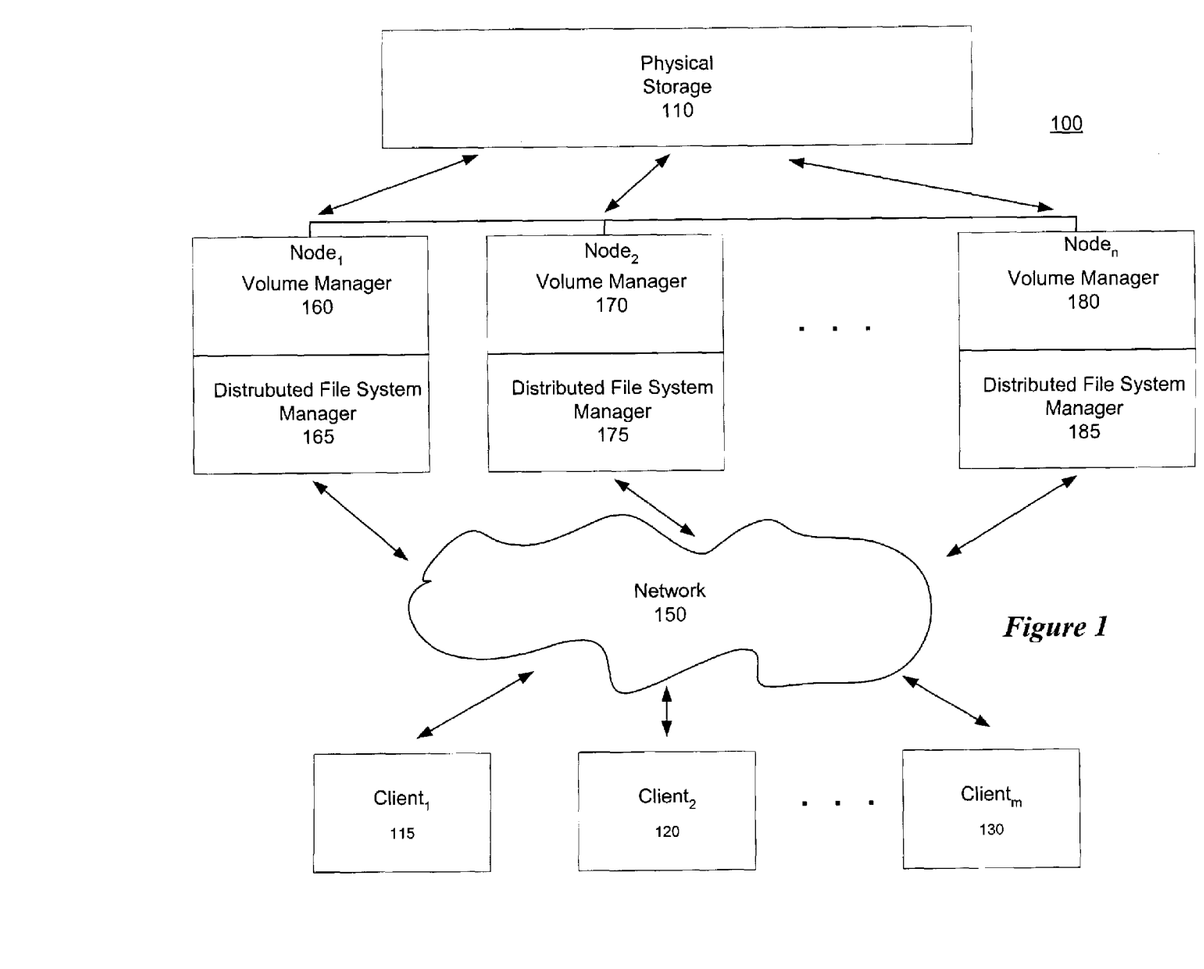
FIG. 1 is a block diagram illustrating one embodiment for the distributed network attached storage system of the present invention.

FIG. 1 is a block diagram illustrating one embodiment for the distributed network attached storage system of the present invention. As shown in FIG. 1, the system 100 includes "n" nodes (wherein n is any integer greater than or equal to two). Each node may be implemented with a conventional computer, such as a server. Also a shown in FIG. 1, the nodes are coupled to each other in order to provide a single image across each node of the system. In one embodiment, the nodes are coupled together through an Ethernet network.

The nodes (1–n) are coupled to a network (150). Also coupled to the network are "m" clients, where "m" is an integer value greater than or equal to one. The network may be any type of network that utilizes any well-known protocol (e.g., TCP/IP, UDP, etc.). Also, as shown in FIG. 1, the distributed NAS system 100 includes physical storage 110 accessible by the nodes. For example, physical storage 110 may comprise one or more hard disk drives, configured to support storage failure modes (i.e., RAID configuration). A client, such as clients 115, 120 and 130, access a node across network 150 to store and retrieve data on physical storage 110.

In general, the distributed NAS system of the present invention creates a single system image that scales in a modular way to hundreds of terabytes and several hundred thousand operations per second. In one embodiment, to minimize costs, the distributed NAS system software runs on industry standard hardware and operates with industry standard operating systems. The distributed NAS system allows flexible configurations based on specific reliability, capacity, and performance requirements. In addition, the distributed NAS system scales without requiring any changes to end user behavior, client software or hardware. For optimal performance, in one embodiment, the distributed NAS system distributes client load evenly so as to eliminate a central control point vulnerable to failure or performance bottlenecks. The distributed NAS system permits storage capacity and performance to scale without disturbing the operation of the system. To achieve these goals, the distributed NAS system utilizes a distributed file system as well as a volume manager. In one embodiment, each node (or server) consists of, in addition to standard hardware and operating system software, a distributed file system manager (165, 175 and 185) and a volume manager (160, 170 and 180) for nodes 1, 2 and n, respectively.

Figure 2:
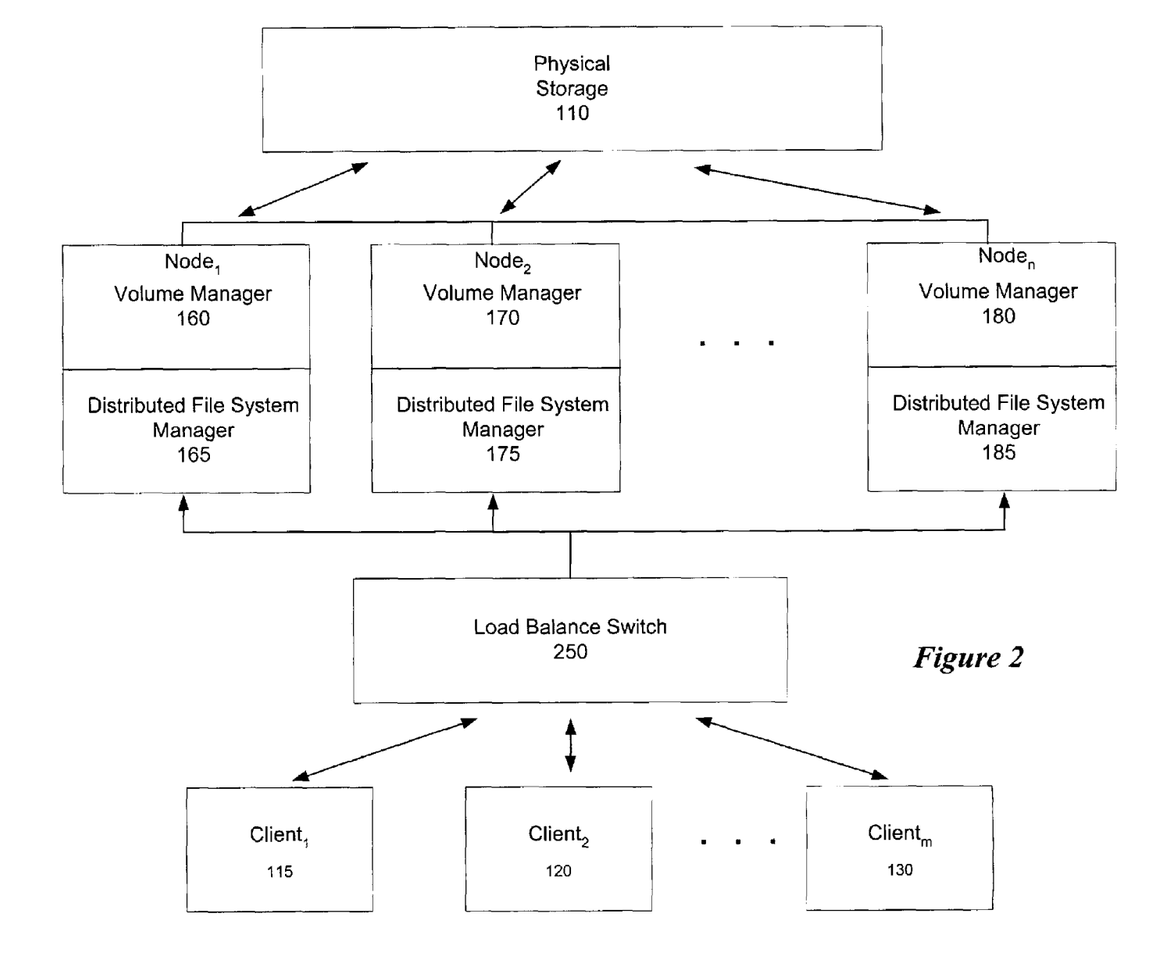
FIG. 2 is a block diagram illustrating one embodiment for assigning client requests in the distributed NAS system.

FIG. 2 is a block diagram illustrating one embodiment for assigning client requests in the distributed NAS system. For this embodiment, clients (1–n) are coupled to a load balance switch 250, accessible over a network. In one embodiment, load balance switch 250 comprises a layer four (L4) load-balancing switch. In general, L4 switches are capable of effectively prioritizing TCP and UDP traffic. In addition, L4 switches, incorporating load-balancing capabilities, distribute requests for HTTP sessions among a number of resources, such as servers. In operation, clients, executing storage operations, access load balance switch 250, and load balance switch 250 selects a node (server) to service the client storage operation.

Figure 3:
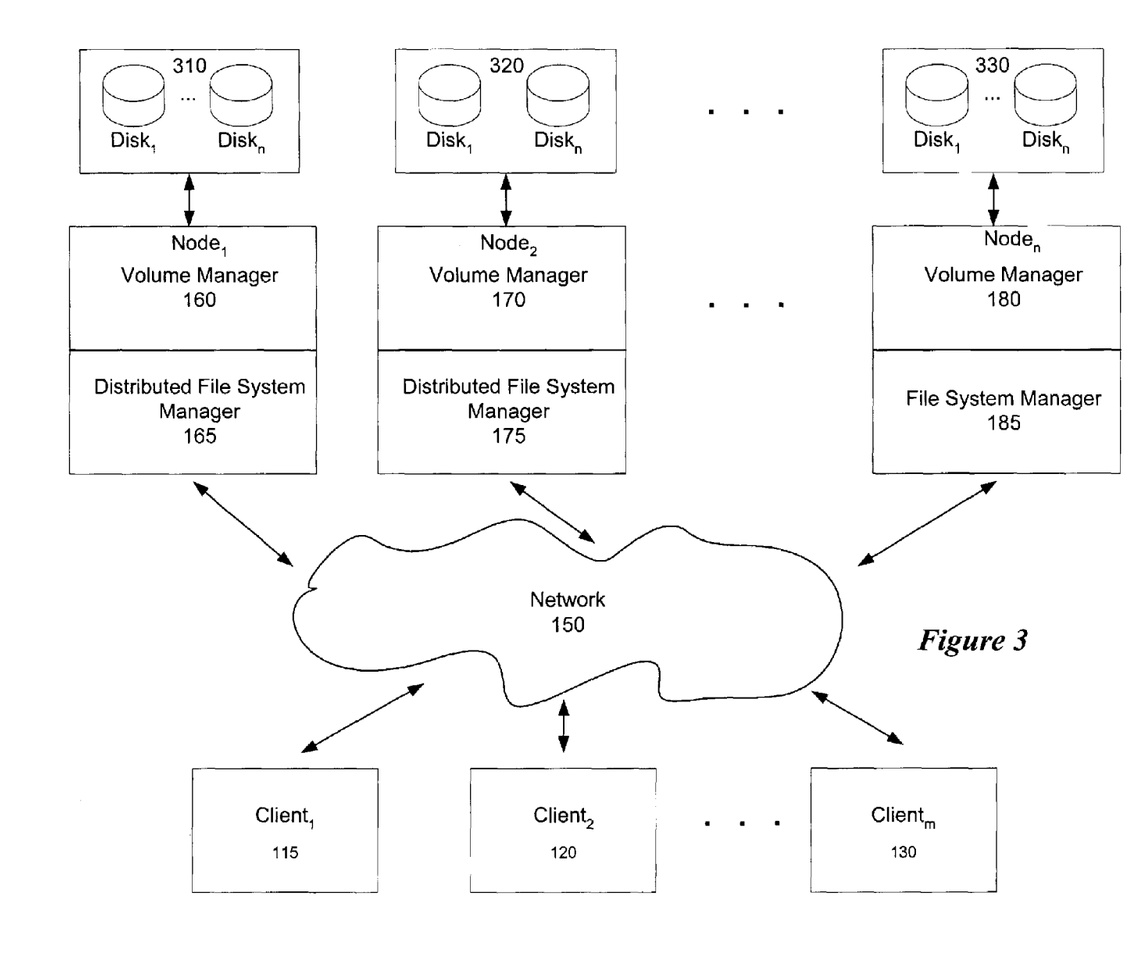
FIG. 3 is a block diagram illustrating one embodiment for a distributed NAS system incorporating direct attached disks.

The nodes of the distributed NAS system communicate with one or more hard disk drives. FIG. 3 is a block diagram illustrating one embodiment for a distributed NAS system incorporating direct attached disks. As shown in FIG. 3, each node (node$_1$, node$_2$ ... node$_n$) is coupled to "n" disks (310, 320 and 330). For this embodiment, a node directly accesses one or more disks through a standard hard disk drive interface (e.g., EIDE, SCSI, iSCSI, or fiber channel). FIG. 3 illustrates "n" disks attached to a node (server); however, although any number of disks, including a single disk, may be attached to a node without deviating from the spirit or scope of the invention.

Figure 4:
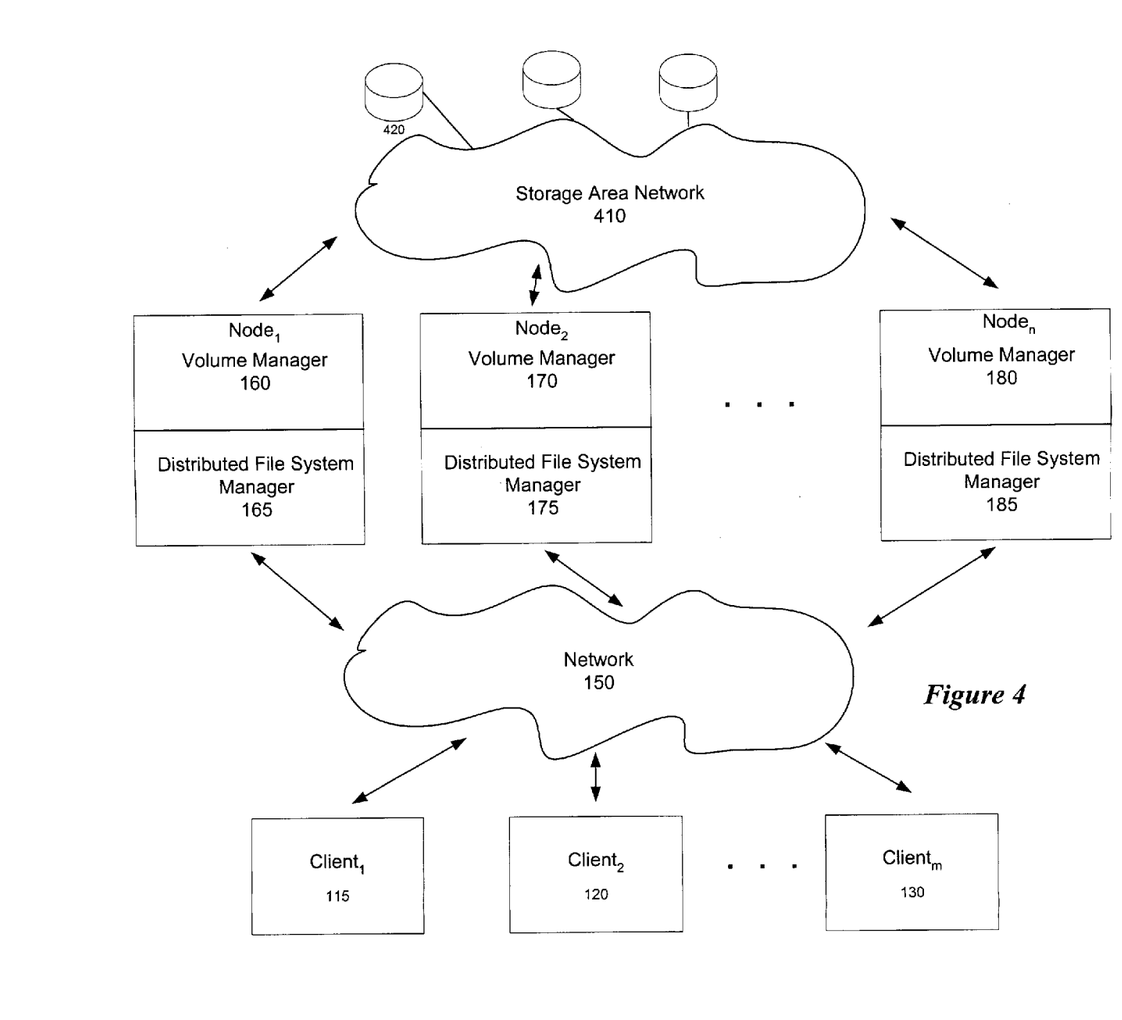
FIG. 4 is a block diagram illustrating one embodiment for using a SAN configuration for a distributed NAS system.

In another embodiment, the nodes of the distributed NAS system utilize disks coupled through a network (e.g., storage area network "SAN"). FIG. 4 is a block diagram illustrating one embodiment for using a SAN configuration for a distributed NAS system. As shown in FIG. 4, the distributed NAS nodes (servers) are coupled to a storage area network 410. The storage area network 410 couples a plurality of hard disk drives to each node (server) in the distributed NAS system. The storage area network 410 may comprise any type of network, such as Ethernet, Fiber Channel, etc. In operation, a node accesses a disk, as necessary, to conduct read and write operations. Each node (server) has access to each disk in the storage area network 410. For example, if volume manager 170 determines that data resides on disk 420, then volume manager 170 accesses disk 420 over storage area network 420 in accordance with the protocol for the storage area network 420. If storage area network 410 implements a TCP/IP protocol, then volume manager 170 generates packet requests to disk 420 using the IP address assigned to disk 420.

In general, index nodes, referred to as "inodes" uniquely identify files and directories. Inodes map files and directories of a file system to physical locations. Each inode is identified by a number. For a directory, an inode includes a list of file names and sub directories, if any, as well as a list of data blocks that constitute the file or subdirectory. The inode also contains size, position, etc. of the file or directory. When a selected node (NAS server) receives a request from the client to service a particular inode, the selected node performs a lookup to obtain the physical location of the corresponding file or directory in the physical media.

Figure 5:
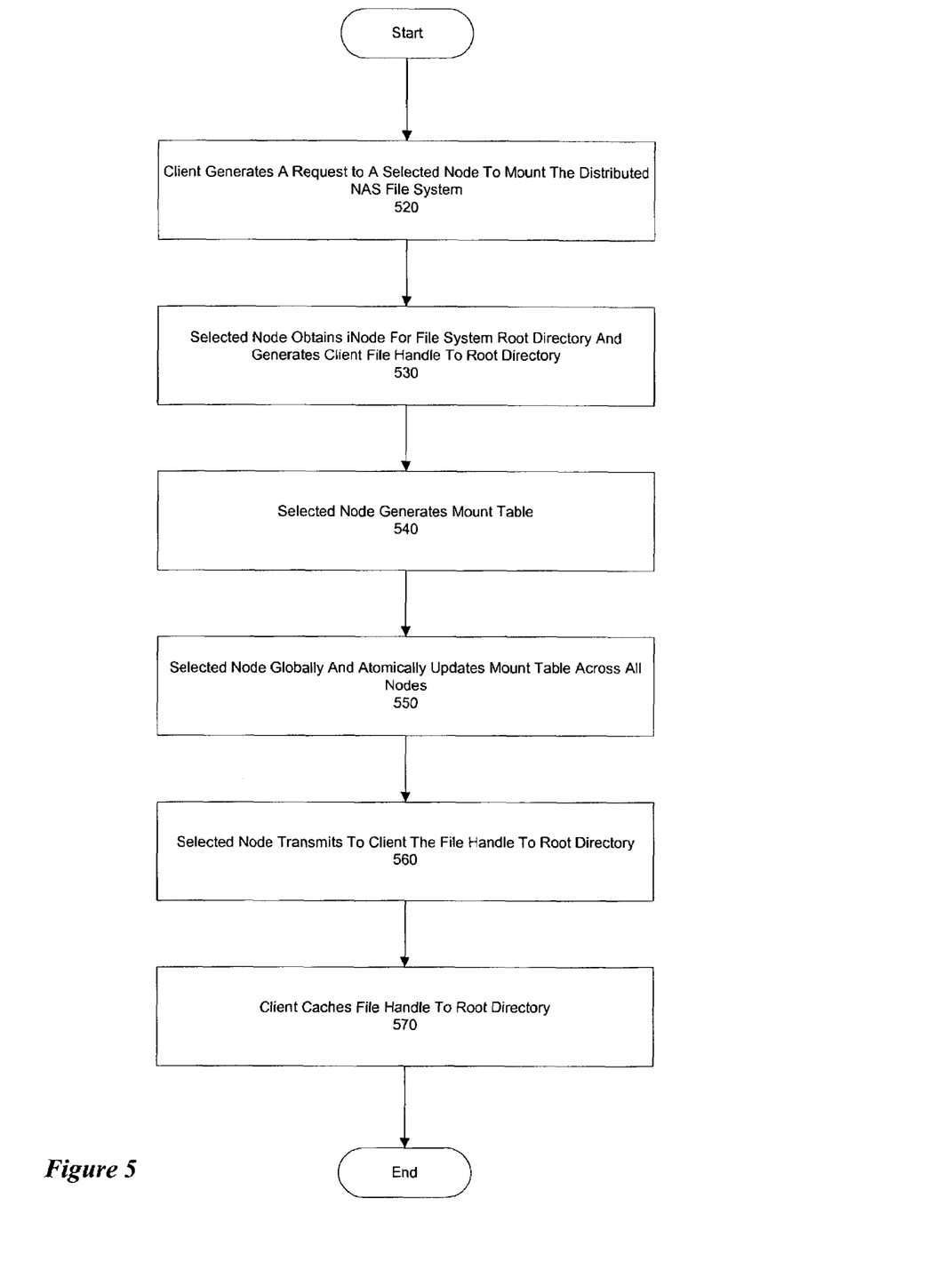
FIG. 5 is a flow diagram illustrating one embodiment for initializing a client computer in the distributed NAS system.

As an initial procedure, a client of the distributed NAS system mounts the distributed file system. FIG. 5 is a flow diagram illustrating one embodiment for initializing a client computer in the distributed NAS system. Through the client distributed NAS software, the client generates a request to a selected node to mount the NAS file system (block 520, FIG. 5). As used herein, the term "selected node" connotes the node servicing the client request. As described above, in one embodiment, the node is selected by a load balance switch (i.e., the client generates a network request to the load balance switch, and the load balance switch selects, based on a load balancing criteria, a server to service the request).

The selected node (file system manager) obtains the inode for the file system root directory, and generates a client file handle to the root directory (block 530, FIG. 5). The selected node determines the inode of the root directory using a "superblock." The superblock is located at a known address on each disk. Each disk uses a superblock to point to a location on one of the disks that stores the inode for the root directory of the file system. Once the root inode is located, the file system manager finds a list of files and directories contained within the root directory.

The file handle, a client side term, is a unique identifier the client uses to access a file or directory in the distributed file system. In one embodiment, the distributed file system translates the file handle into an inode. In addition, a file handle may include the time and date information for the file/directory. However, any type of file handle may be used as long as the file handle uniquely identifies the file or directory.

The selected node (the node processing the client requests) generates a mount table (block 540, FIG. 5). In general, the mount table tracks information about the client (e.g., client address, mounted file systems, etc.). The mount table, a data structure, is replicated in each node of the distributed NAS system, and is globally and atomically updated (block 550, FIG. 5). The selected node transmits to the client a file handle to the root directory (block 560, FIG. 5). The client caches the file handle for the root directory (block 570, FIG. 5).

In one embodiment, the file system for the distributed NAS is a high-performance distributed file system. The file system fully distributes both namespace and data across a set of nodes and exports a single system image for clients, applications and administrators. As a multi-node system, the file system acts as a highly scalable, high-performance file server with no single point of failure. As a storage medium, the file system utilizes a single shared disk array. It harnesses the power of multiple disk arrays connected either via a storage area network or directly to network servers. The file system is implemented entirely in user space, resulting in a lightweight and portable file system. In one embodiment, the file system provides 64-bit support to allow very large file system sizes.

The volume manager (160, 170 and 180, FIG. 1) controls and virtualizes logical storage volumes, either directly attached to a node, through EIDE, SCSI, iSCSI, fiber channel, or indirectly attached through another server on the LAN. The volume manager offers administrators access to advanced management features. It provides the ability to extend logical volumes across nodes. This results in unprecedented flexible, reliable, high-performance storage management in a multi-node network environment.

The volume manager consists of three parts: logical volumes, volume groups, and physical volumes. Each layer has particular properties that contribute to the capabilities of the system. The distributed volume group is the core component of the system. A volume group is a virtualized collection of physical volumes. In its simplest form, a distributed volume group may be analogized to a special data container with reliability properties. A volume group has an associated level of reliability (e.g., RAID level). For example, a distributed volume group may have similar reliability characteristics to traditional RAID 0,1 or 5 disk arrays. Distributed volume groups are made up of any number, type or size of physical volumes.

A logical volume is a logical partition of a volume group. The file systems are placed in distributed logical volumes. A logical extent is a logically contiguous piece of storage within a logical volume. A physical volume is any block device, either hardware or software, exposed to the operating system. A physical extent is a contiguous piece of storage within a physical storage device. A sector, typically 512 bytes, defines the smallest unit of physical storage on a storage device.

A physical volume is a resource that appears to the operating system as a block based storage device (e.g., a RAID device, the disk through fiber channel, or a software RAID device). A volume, either logical or physical, consists of units of space referred to as "extents." Extents are the smallest units of contiguous storage exposed to the distributed volume manager.

The volume manager allows unprecedented flexibility and scalability in storage management, to enhance the reliability of large-scale storage systems. In one embodiment, the distributed volume manager implements standard RAID 0, 1 and 5 configurations on distributed volume groups. When created, each distributed volume group is given the reliability settings that includes stripe size and raid-set size. Stripe size, sometimes referred to as a chunk or block, is the smallest granularity of data written to an individual physical volume. Stripe sizes of 8 k, 16 k and 24 k are common. RAID-set size refers to the number of stripes between parity calculations. This is typically equal to the number of physical volumes in a volume group.

As discussed above, inodes consist of pointers to physical blocks that store the underlying data. In one embodiment, inodes are stored on disk in "ifiles." For directories, inode files contain a list of inodes for all files and directories contained in that directory. In one embodiment, the distributed NAS system utilizes a map manager. In general, a map manager stores information to provide an association between inodes and distributed NAS nodes (servers) managing the file or directory. The map manager, a data structure, is globally stored (i.e., stored on each node) and is atomically updated. Table 1 is an example map manager used in the distributed NAS system.

TABLE 1

| Inode Range | Node |
|---|---|
| 0-100 | A |
| 101-200 | B |
| 201-300 | C |

For this example, the distributed NAS system contains three nodes (A, B and C). Inodes within the range from 0 to 100 are managed by node$_A$. Inodes, lying within the range of 101 to 200, are managed by node$_B$, and inodes, falling within the range of 201-300, are managed by node$_C$.

Figure 6:
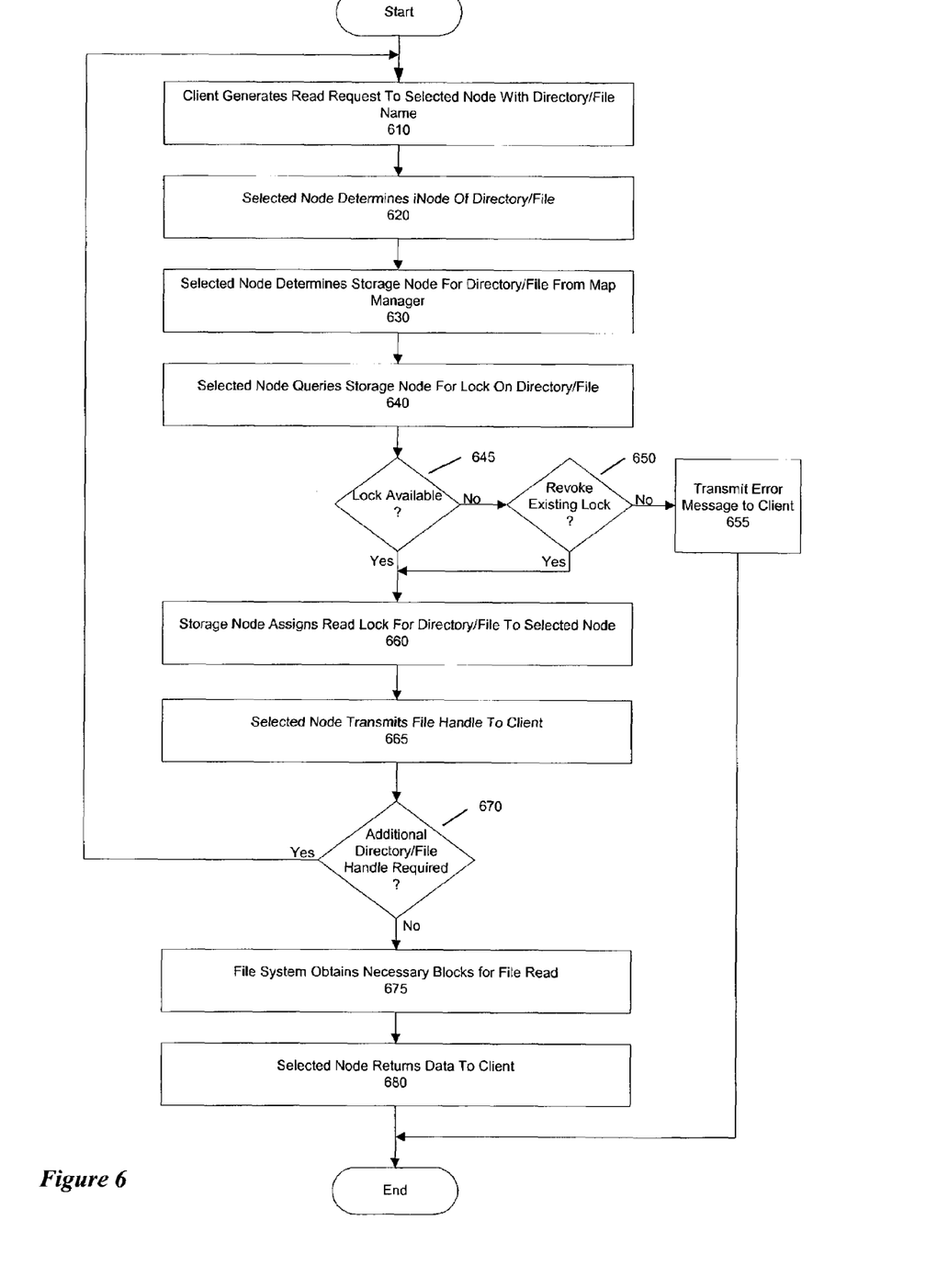
FIG. 6 is a flow diagram illustrating one embodiment for conducting a read operation in the distributed NAS system.

FIG. 6 is a flow diagram illustrating one embodiment for conducting a read operation in the distributed NAS system. To conduct a read operation, a client generates a read request to the distributed NAS system with a directory/file name (block 610, FIG. 6). The distributed NAS system selects a node to process the request (i.e., selected node). For example, the load-balancing switch may select node$_C$ to process the read operation. Also, for this example, a client may generate a request to read the file "/export/temp/foo.txt." For this example, the client must obtain a file handle for "/export/temp/foo.txt." To accomplish this, the client starts with the root file handle (i.e., the root file handle was obtained when the client mounted the distributed file system).

If the client has cached the file handle for "/export", then the client first requests a file handle for "/export/temp." In response to the client request, the selected node (server) determines the inode for the directory/file (block 620, FIG. 6). For the above example, the selected node determines the inode for the directory "/export/temp." Specifically, the selected node looks-up, in the list of modes for the "/export" directory, the inode for the directory "/temp." For purposes of explanation, the associated inode for the directory "/temp" is 55.

With the inode, the selected node determines, from the map manager, the storage node from the directory/file (block 630, FIG. 6). For the above example and the map manager shown in Table 1, inode 55 is managed by node$_A$. The selected node queries the storage node (the node managing the directory/file) for a lock on the directory/file (block640, FIG. 6). In the example set forth above, node$_C$, the selected node, queries node$_A$, the storage node, to obtain a lock for the directory "/export/temp." A lock may be an exclusive or shared lock, including both read and write types. If a lock is available for the file/directory, then the storage node assigns a read lock for the directory/file to the selected node (blocks 645 and 660, FIG. 6). If a lock is not available, then the storage node attempts to revoke the existing lock(s) (blocks 645 and 650, FIG. 6). If the storage node can revoke the existing lock(s), then the storage node assigns a read lock to the selected node for the directory/file (blocks 650 and 660, FIG. 6). If the storage node cannot revoke existing lock(s), then an error message is transmitted to the client that the file/directory is not currently available for reading (blocks 650 and 655, FIG. 6).

After obtaining the appropriate lock, the selected node transmits a file handle to the client (block 665, FIG. 6). For the above example, the selected node, node$_C$, transmits a file handle for the directory "/export/temp." The client caches the file handle. If additional directory/file handles are required to read the file, the process to obtain additional directory/file handles is performed (block 670, FIG. 6). For the above example, the client generates a read request for "expert/temp/foo.txt." Thereafter, the selected node determines the inode for the file "/export/temp/foo.txt." For this example, the file system manager looks-up inode 55, and identifies the file, foo.txt, as being located in the "/temp directory." The file system manager extracts the inode associated with the file, foo.txt (e.g., inode=136). The map manager identifies node$_B$ as the owner of inode 136. Thus, node$_C$, the selected node, communicates with node$_B$, the storage node, to obtain a lock for the file, foo.txt. Node$_C$ then returns the file handle of foo.txt to the client.

In response to the read request, the file system manager obtains the necessary blocks, from the volume manager, to read the file (block 675, FIG. 6). The file system manager, using inode 136, looks-up in the file inode, and identifies the physical blocks associated with inode 136. For the above example, if the client requested to read the first 1024 bytes of the file, then the file system manager issues the command, (read blocks 130 and 131, buffer) to read the first two blocks of the file (e.g., the first two blocks of the file "/export/temp/foo.txt" are numbered 130 and 131). In response, the volume manager places the first 1024 bytes of the file "/export/temp/foo.txt" in a buffer. The selected node returns the data from the buffer to the client (block 680, FIG. 6).

Figure 7:
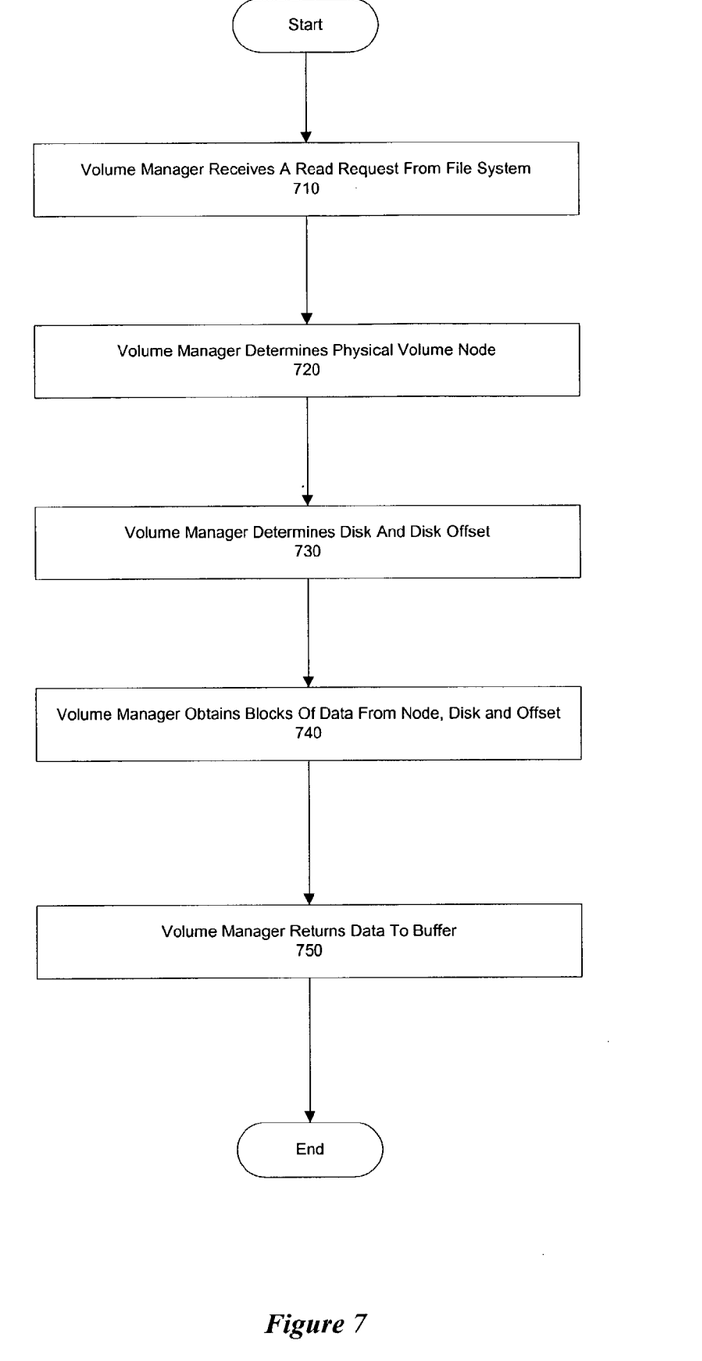
FIG. 7 is a flow diagram illustrating one embodiment for processing read operations in the volume manager.

In general, the volume manager responds to requests from the distributed file system manager. FIG. 7 is a flow diagram illustrating one embodiment for processing read operations in the volume manager. To initiate the process, the volume manager receives the request from the file system manager (block 710, FIG. 7). A volume is spread across nodes. Each disk (e.g., 0-256 sectors) requires a mapping to translate virtual sectors to physical sectors. The volume manager determines the physical volume node for the subject of the read operation (block 720, FIG. 7). The volume manager communicates with the physical volumes. To conduct a read operation, the file system manager requests the volume manager to read/write a block or a group of sectors (e.g., sectors 24-64, etc.).

The volume manager determines the disk and disk offset (block 730, FIG. 7). The volume manager algebraically determines the location of the logical sectors on the physical volumes. Table 2 illustrates an example mapping from disks to nodes for an example distributed NAS system.

TABLE 2

| Sector | Physical Disk | Node |
|---|---|---|
| 0-256 | 1 | A |
| 257-512 | 2 | B |
| 513-768 | 3 | C |
| 767-1024 | 4 | C |

For this embodiment, the volume manager calculates the node in accordance with the arrangement illustrated in Table 2. The disks are apportioned by sectors, and the offset measures the number of sectors within a disk. The volume manager obtains blocks of data from the node, disk on the node and the offset within the disk (block 740, FIG. 7). The volume manager then returns data to the buffer (file system manager) (block 750, FIG. 7).

Figure 8:
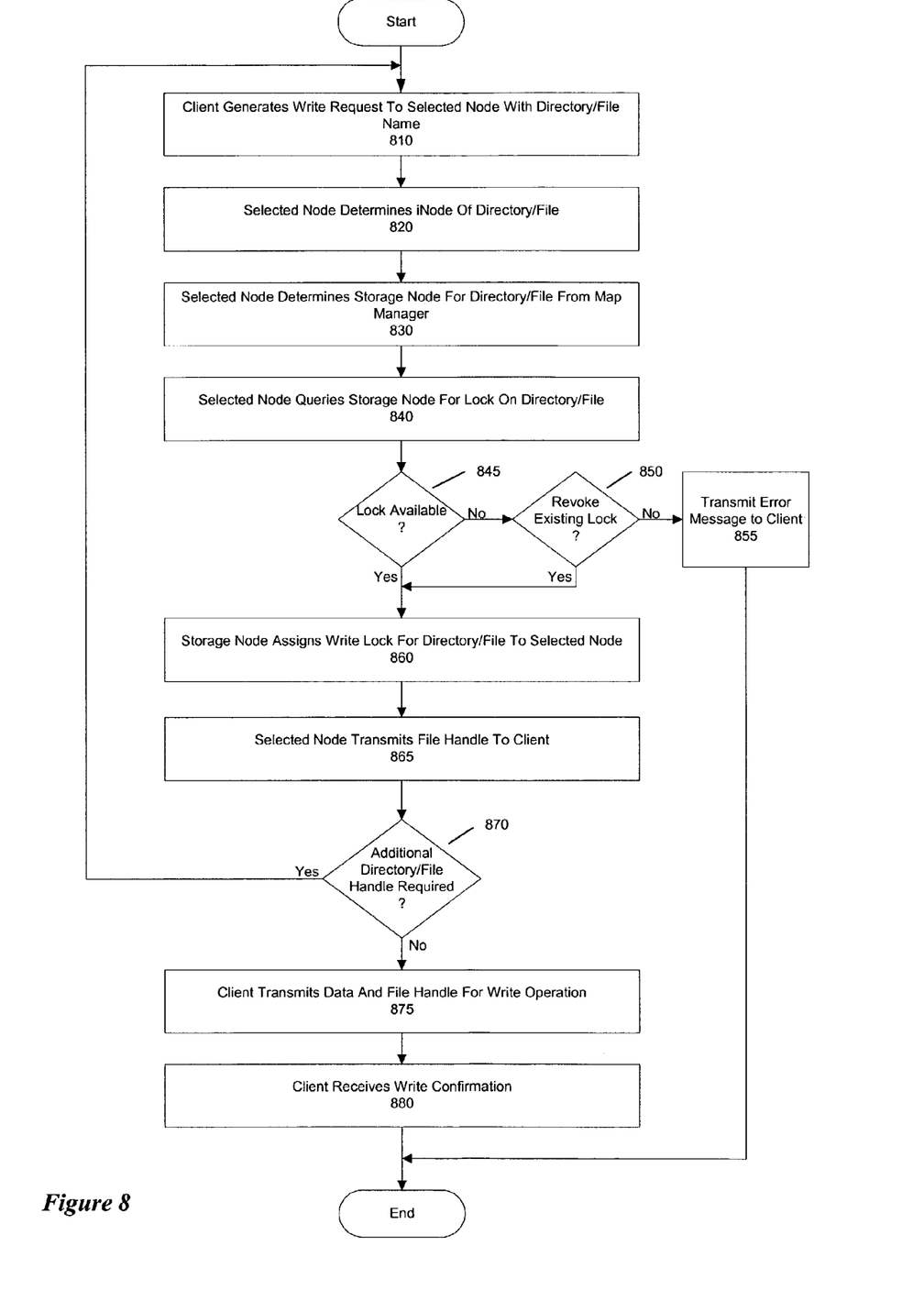
FIG. 8 is a flow diagram illustrating one embodiment for conducting a write operation in the distributed NAS system.

FIG. 8 is a flow diagram illustrating one embodiment for conducting a write operation in the distributed NAS system. First, a client generates a write request to the distributed NAS system with a directory/file name (block 810, FIG. 8). The distributed NAS system selects a node to process the request (e.g., node$_C$). Using the above example, a client may generate a request to write to the file "/export/temp/foo.txt." For this example, the client must obtain a file handle for "/export/temp/foo.txt." As described above, the client starts with the root file handle. If the client has cached the file handle for "/export", then the client first requests a file handle for "/export/temp." In response to the client request, the selected node (server) determines the inode for the directory/file (block 820, FIG. 8). For the above example, the selected node determines the inode for the directory "/export/temp.", inode 55.

The selected node determines, from the map manager, the storage node from the directory/file for the associated inode (block 830, FIG. 8). For the above example (Table 1), inode 55 is managed by node$_A$. The selected node queries the storage node (the node managing the directory/file) for a lock on the directory/file (block 840, FIG. 8). Thus, node$_C$, the selected node, queries node$_A$, the storage node, to obtain a write lock for the directory "/export/temp." If a write lock is available for the file/directory, then the storage node assigns the write lock for the directory/file to the selected node (blocks 845 and 860, FIG. 8). If a lock is not available, then the storage node attempts to revoke the existing lock(s) (blocks 845 and 850, FIG. 8). If the storage node can revoke the existing lock(s), then the storage node assigns the write lock to the selected node for the directory/file (blocks 850 and 860, FIG. 8). If the storage node cannot revoke existing lock(s), then an error message is transmitted to the client that the file/directory is not currently available for writing (blocks 850 and 855, FIG. 8).

After obtaining the appropriate lock, the selected node transmits a file handle to the client (block 865, FIG. 8). For the above example, the selected node, node$_C$, transmits a file handle for the directory "/export/temp." The client caches the file handle. If additional directory/file handles are required to read the file, the process to obtain additional directory/file handles are performed (block 870, FIG. 8). For the above example, the client generates a read request for "expert/temp/foo.txt." As discussed above, the selected node determines the inode for the file "/export/temp/foo.txt", (e.g., inode=136). The map manager identifies node$_B$ as the owner of inode 136. A lock for the file, foo.txt, is obtained. Node$_C$ then returns the file handle of foo.txt to the client.

The client transmits data, for the write operation, and the file handle (block 875, FIG. 8). The file system manager, and the volume manager execute the write operation (See FIG. 9). The client receives a written confirmation from the file system manager (block 880, FIG. 8).

Figure 9:
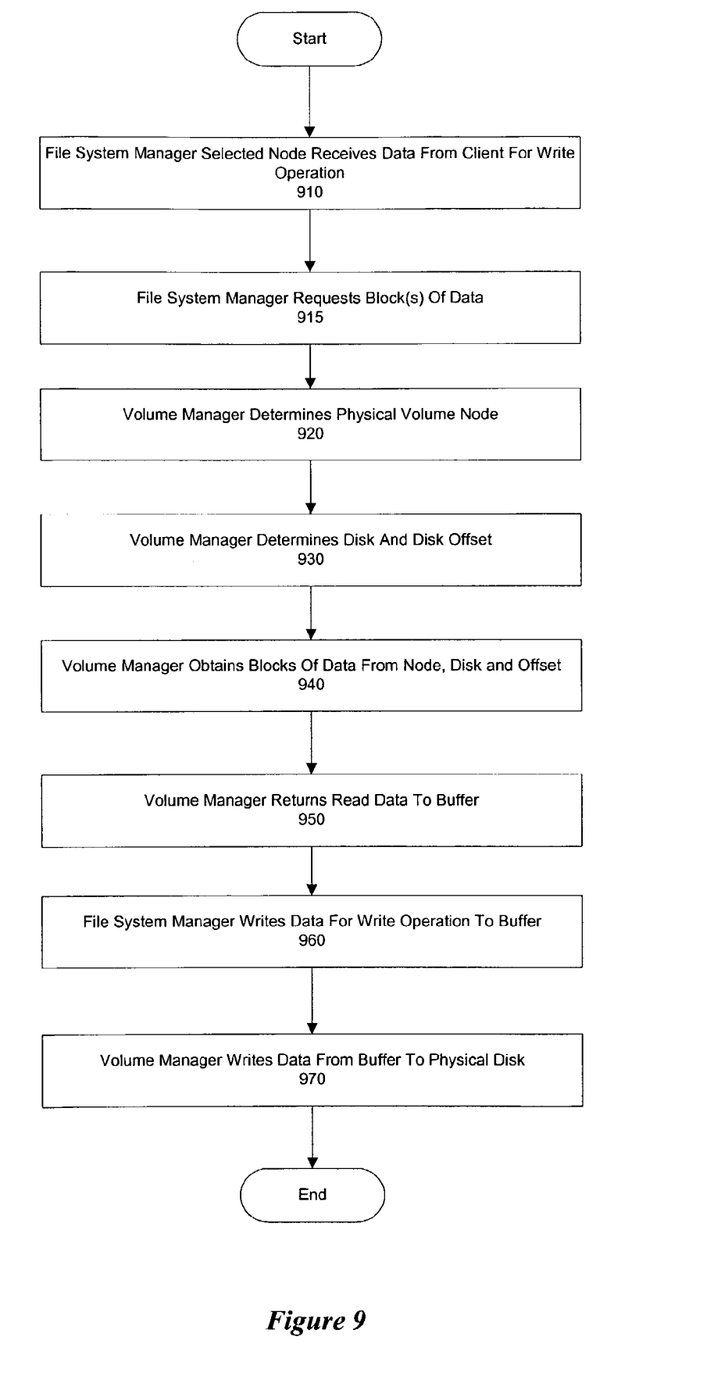
FIG. 9 is a block diagram illustrating one embodiment for performing a write operation in the volume manager.

FIG. 9 is a block diagram illustrating one embodiment for performing a write operation in the volume manager. The file manager on the selected node receives data from the client for the write operation (block 910, FIG. 9). In response, the file system manager requests blocks of data from the volume manager (block 915, FIG. 9). The volume manager determines the physical volume node for the write operation (block 920, FIG. 9). The volume manager determines the disk and disk offset (block 930, FIG. 9). The volume manager then obtains blocks of data from the node, disk and offset (block 940, FIG. 9). The volume manager returns read data to a buffer (block 950, FIG. 9). The file system manager writes data for the write operation to the buffer (block 960, FIG. 9). Thereafter, volume manager writes data from the buffer to the physical disk (block 970, FIG. 9).

Although the present invention has been described in terms of specific exemplary embodiments, it will be appreciated that various modifications and alterations might be made by those skilled in the art without departing from the spirit and scope of the invention.

What is claimed is:

1. A distributed data storage system comprising:
   a plurality of physical storage volumes for storing files of data identified by a single file system;
   a network;

a plurality of storage nodes, coupled to said network, each one of said storage nodes for conducting storage operations including read and write operation on said files of data stored on said physical storage volumes, the plurality of files of data being distributed across the plurality of physical storage volumes by distributing both namespace and data across the plurality of storage nodes, each of the plurality of storage nodes for managing a subset of inode numbers, each inode number identifying a different inode uniquely identifying a different one of the files of data in the single file system, each storage node storing a list of the subset of inode number managed by each of the plurality of storage nodes to provide the single file system across each of the plurality of storage nodes; and a load balancing switch, coupled to said network and to said storage nodes, for receiving a request from a client to conduct a selected one of the storage operations on an identified one of the plurality of files in said single file system and for selecting one of said storage nodes to process said selected one of the storage operations, the one of said storage nodes to process said selected one of the storage operations also being to perform a mounting of the distributed file system, the mounting including obtaining a respective inode to a root directory and generating a client file handle to the root directory and mount table, wherein said selected node globally and atomically updates mount table of the plurality of storage nodes, the mounting also including transmitting to the client the file handle to the root directory, the respective inode uniquely identifying the root directory.

2. The distributed data storage system as set forth in claim 1, wherein a respective storage node comprises:
   a distributed file system manager for processing a plurality of client requests for storage operations; and
   a volume manager for accessing said physical storage volumes.

3. The distributed data storage system as set forth in claim 2, wherein said distributed file system manager of a first storage node for communicating to a volume manager of a second storage node to access a desired file stored on a physical volume attached to said second storage node.

4. The distributed data storage system of claim 2, wherein said volume manager to extend to a logical volume comprising a plurality of said physical volumes across said storage nodes.

5. A method for selecting storage nodes in a distributed data storage system, said method comprising the steps of:
   storing a plurality of files of data identified by a single file system in a plurality of physical storage volumes;
   coupling said physical storage volumes to a plurality of storage nodes;
   coupling said storage nodes to a load balancing switch;
   coupling said load balancing switch to a network;
   receiving a request from a client at said load balancing switch to conduct a selected one of a plurality of storage operations on an identified one of the plurality of files in said plurality of files of data, the plurality of files being distributed across the plurality of physical storage volumes by distributing both namespace and data across the plurality of storage nodes;
   managing, by each of the plurality of storage nodes, a subset of inode numbers, each inode number identifying a different inode uniquely identifying a different one of the files of data in the single file system;
   storing, in each storage node, a list of the subset of inode numbers managed by each of the plurality of storage nodes to provide said single file system across each of the plurality of storage nodes;
   selecting, at said load balancing switch, one of said storage nodes to process said selected one of the storage operations on an identified one of the plurality of files in said single file system and for selecting one of said storage nodes to process said selected one of the storage operations, the one of said storage nodes to process said selected one of the storage operations also being to perform a mounting of the distributed file system, the mounting including obtaining a respective inode to a root directory and generating a client file handle to the root directory and mount table, wherein said selected node globally and atomically updates mount table of the plurality of storage nodes, the mounting also including transmitting to the client the file handle to the root directory, the respective inode uniquely identifying the root directory; and
   conducting the plurality of storage operations including read and write operations on said files of said file system stored on said physical storage volumes.

6. The method as set forth in claim 5, wherein the step of conducting the plurality of storage operations on said files of said file single system stored on said physical storage volumes comprise the steps of:
   processing a plurality of client requests for storage operations in a distributed file system manager; and
   accessing said physical volumes from a volume manager.

7. The method as set forth in claim 6, further comprising the steps of:
   communicating from a distributed file system manager of a first storage node to a volume manager of a second storage nodes; and
   accessing a respective file stored on a physical volume attached to said second storage node.

8. The method of claim 6, wherein said volume manager to extend a logical volume comprising a plurality of said physical volumes across said storage nodes.

9. A computer readable medium for storing a plurality of instructions, which when executed by a computer system, cause the computer to perform the steps of:
   storing a plurality of files of data identified by a singe file system in a plurality of physical storage volumes;
   coupling said physical storage volumes to a plurality of storage nodes;
   coupling said storage nodes to a load balancing switch;
   coupling said load balancing switch to a network;
   receiving a request from a client at said load balancing switch to conduct a selected one of a plurality of storage operations on an identified one of the files in said plurality of files of data, the plurality of file of data being distributed across the plurality of physical storage volumes by distributing both namespace and data across the plurality of storage nodes;
   managing, by each of the plurality of storage nodes, a subset of inode numbers, each inode number identifying a different inode uniquely identifying a different one of the plurality of files of data in the single file system;
   storing, in each storage node, a list of the subset of inode numbers managed by each of the plurality of storage nodes to provide said single file system across each of the plurality of storage nodes;
   selecting, at said load balancing switch, one of said storage nodes to process said selected one of the storage operations on an identified one of the plurality of files in said single file system and for selecting one of said storage nodes to process said selected one of the storage operations, the one of said storage nodes to process said selected one of the storage operations also being to perform a mounting of the distributed file system, the mounting including obtaining a respective inode to a root directory and generating a client file handle to the root directory and mount table, wherein said selected node globally and atomically updates mount table of the plurality of storage nodes, the mounting also including transmitting to the client the file handle to the root directory, the respective inode uniquely identifying the root directory: and conducting the plurality of storage operations including read and write operations on said plurality of files of said file system stored on said physical storage volumes.

10. The computer readable medium as set forth in claim 9, wherein the step of conducting storage operations on said plurality of files of said file single system stored on said physical storage volumes comprises the steps of:

processing said plurality of client requests for storage operations in a distributed file system manager; and accessing said physical volumes from a volume manager.

11. The computer readable medium as set forth in claim 10, further comprising the steps of:

communicating from distributed file system manager of a first storage node to a volume manager of a second storage node; and accessing a desired file stored on a physical volume attached to said second storage node.

12. The computer readable medium of claim 10, wherein said volume manger to extend a logical volume comprising a plurality of said physical volumes across said storage nodes.

* * * * *

UNITED STATES PATENT AND TRADEMARK OFFICE
CERTIFICATE OF CORRECTION

PATENT NO. : 7,509,645 B2
APPLICATION NO. : 10/367541
DATED : March 24, 2009
INVENTOR(S) : Coates et al.

Page 1 of 1

It is certified that error appears in the above-identified patent and that said Letters Patent is hereby corrected as shown below:

In column 11, line 11, in Claim 9, after "directory" delete ":" (colon) and insert -- ; -- (semi-colon), therefor.

Signed and Sealed this

Sixteenth Day of June, 2009

JOHN DOLL
*Acting Director of the United States Patent and Trademark Office*